(12) United States Patent
Chopra et al.

(10) Patent No.: US 11,400,807 B2
(45) Date of Patent: Aug. 2, 2022

(54) ELECTRIC AXLE ASSEMBLY

(71) Applicant: ALLISON TRANSMISSION, INC., Indianapolis, IN (US)

(72) Inventors: Vikram Chopra, Troy, MI (US); Christopher G. Baillie, Lake Orion, MI (US); Siva Srinivas Rajeev Mupparti, Clarkson, MI (US)

(73) Assignee: Allison Transmission, Inc., Indianapolis, IN (US)

( * ) Notice: Subject to any disclaimer, the term of this patent is extended or adjusted under 35 U.S.C. 154(b) by 0 days.

(21) Appl. No.: 17/268,527

(22) PCT Filed: Aug. 16, 2019

(86) PCT No.: PCT/US2019/046868
§ 371 (c)(1),
(2) Date: Feb. 15, 2021

(87) PCT Pub. No.: WO2020/037233
PCT Pub. Date: Feb. 20, 2020

(65) Prior Publication Data
US 2021/0237566 A1   Aug. 5, 2021

Related U.S. Application Data

(60) Provisional application No. 62/765,056, filed on Aug. 16, 2018.

(51) Int. Cl.
*B60K 17/04* (2006.01)
*B60K 17/16* (2006.01)
(Continued)

(52) U.S. Cl.
CPC .......... *B60K 17/046* (2013.01); *B60K 17/16* (2013.01); *F16H 3/54* (2013.01); *B60Y 2400/73* (2013.01);
(Continued)

(58) Field of Classification Search
CPC ........ B60K 17/046; B60K 17/16; F16H 3/54; B60Y 2400/73; B60Y 2410/10; B60Y 2200/2005; B60Y 2200/2094
See application file for complete search history.

(56) References Cited

U.S. PATENT DOCUMENTS

| 7,500,931 B2* | 3/2009 | Rosemeier ........... B60K 17/346 475/5 |
| 8,541,915 B2 | 9/2013 | Burns et al. |

(Continued)

FOREIGN PATENT DOCUMENTS

| DE | 102015214309 A1 | 2/2017 |
| DE | 102015016939 | 6/2017 |

(Continued)

OTHER PUBLICATIONS

PCT Search Report and Written Opinion prepared for PCT/US2019/046868, completed Oct. 18, 2019.

(Continued)

*Primary Examiner* — Tinh Dang
(74) *Attorney, Agent, or Firm* — Barnes & Thornburg LLP

(57) ABSTRACT

An electric axle assembly includes a drive housing and a drive assembly. The drive assembly is housed in the drive housing and engages with wheels of a vehicle for rotating the wheels to move the vehicle along a ground surface. The drive assembly includes a drive input, one or more gearsets, and axle shafts. The one or more gearsets transfer motive force from the drive input to the axle shafts.

19 Claims, 10 Drawing Sheets

(51) Int. Cl.
*F16H 3/54* (2006.01)
*B60K 1/02* (2006.01)
(52) U.S. Cl.
CPC ... *B60Y 2410/10* (2013.01); *F16H 2200/2005* (2013.01); *F16H 2200/2094* (2013.01)

(56) References Cited

U.S. PATENT DOCUMENTS

| | | | | |
|---|---|---|---|---|
| 8,663,051 | B2* | 3/2014 | Sten | F16H 48/36 |
| | | | | 475/205 |
| 9,637,022 | B2* | 5/2017 | Gavling | B60L 15/025 |
| 9,950,607 | B2* | 4/2018 | Littlefield | F16H 37/02 |
| 10,173,515 | B2* | 1/2019 | Banshoya | F16H 61/0267 |
| 10,214,093 | B2* | 2/2019 | Banshoya | B60K 6/387 |
| 2005/0023053 | A1 | 2/2005 | Bennett | |
| 2007/0087885 | A1* | 4/2007 | Rosemeier | F16H 48/11 |
| | | | | 475/5 |
| 2007/0199339 | A1 | 8/2007 | Ishihara et al. | |
| 2010/0206127 | A1* | 8/2010 | Wheals | B60K 23/04 |
| | | | | 74/665 T |
| 2012/0058855 | A1* | 3/2012 | Sten | F16H 48/36 |
| | | | | 475/205 |
| 2012/0104883 | A1 | 5/2012 | Burns et al. | |
| 2014/0364264 | A1 | 12/2014 | Sten | |
| 2016/0318419 | A1* | 11/2016 | Gavling | F16H 48/36 |
| 2017/0136870 | A1* | 5/2017 | Littlefield | B60K 17/356 |
| 2017/0271955 | A1 | 9/2017 | Hanumalagutti et al. | |
| 2018/0054097 | A1 | 2/2018 | Diala et al. | |
| 2019/0017573 | A1 | 1/2019 | Schilder et al. | |

FOREIGN PATENT DOCUMENTS

| | | |
|---|---|---|
| EP | 2712066 | 3/2014 |
| JP | H09154257 A1 | 6/1997 |
| KR | 101338796 B1 | 12/2013 |
| WO | 2017114423 A1 | 7/2017 |

OTHER PUBLICATIONS

International Preliminary Report on Patentability for International Patent Application No. PCT/US2019/053648, dated Mar. 23, 2021, 7 pages.
International Preliminary Report on Patentability for International Patent Application No. PCT/US2019/053457, dated Mar. 23, 2021, 8 pages.
PCT Search Report and Written Opinion prepared for PCT/US2019/053648, completed Feb. 14, 2020, 10 pages.
PCT Search Report and Written Opinion prepared for PCT/US2019/053457, completed Jan. 21, 2020, 10 pages.

* cited by examiner

ELECTRIC AXLE ASSEMBLY

CROSS-REFERENCE TO RELATED U.S. PATENT APPLICATION

This present application is the U.S. national phase of PCT/US2019/046868, filed on Aug. 16, 2019, which claims priority under 35 U.S.C. § 119(e) to U.S. Provisional Patent Application Serial No. 62/765,056, filed on Aug. 16, 2018, the disclosures of both of which are hereby incorporated by reference in their entirety.

TECHNICAL FIELD

The present disclosure relates generally to axle assemblies for vehicles, and more particularly, to an electric axle assembly for a vehicle.

BACKGROUND

Many vehicles utilize axles to support the vehicle. At least some of these axles are drive axles capable of propelling the vehicle. Typically, an internal combustion engine is coupled to the drive axle via a driveshaft. Increasingly, manufacturers have turned to electric and hybrid propulsion systems for increased performance and efficiency.

Accordingly, there is a need to provide an axle assembly that allows one or more electric drive units to be packaged into the vehicle while optimizing efficiency and performance.

SUMMARY

In accordance with the present disclosure, an electric axle assembly includes a housing and a drive assembly. The drive assembly is housed in the housing and engages with wheels of a vehicle for rotating the wheels to move the vehicle along a ground surface. The drive assembly includes a drive input, one or more gearsets, and axle shafts. The gearsets transfer motive force from the drive input to the axle shafts.

In illustrative embodiments, the electric axle assembly includes an input gearset arranged for rotation about an axis. The input gearset includes a first configuration providing a first gear ratio and a second configuration providing a second gear ratio different from the first gear ratio. The electric axle assembly also includes an output gearset arranged for rotation about the axis and spaced apart along the axis from the input gearset and a differential coupled to the output gearset. A clutch arrangement is configured to engage with the input gearset to move the input gearset between the first configuration and the second configuration.

In illustrative embodiments, the drive input is offset from the axis and configured to selectively apply motive force to the input gearset, the input gearset is configured to transfer the motive force received from the drive unit to the output gearset, the output gearset is configured to transfer the motive force received from the input gearset to the differential, and the differential is configured to transfer the motive force received from the output gearset to the first and second axle shafts.

BRIEF DESCRIPTION OF THE DRAWINGS

The systems and methods described herein are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

Figure 1:
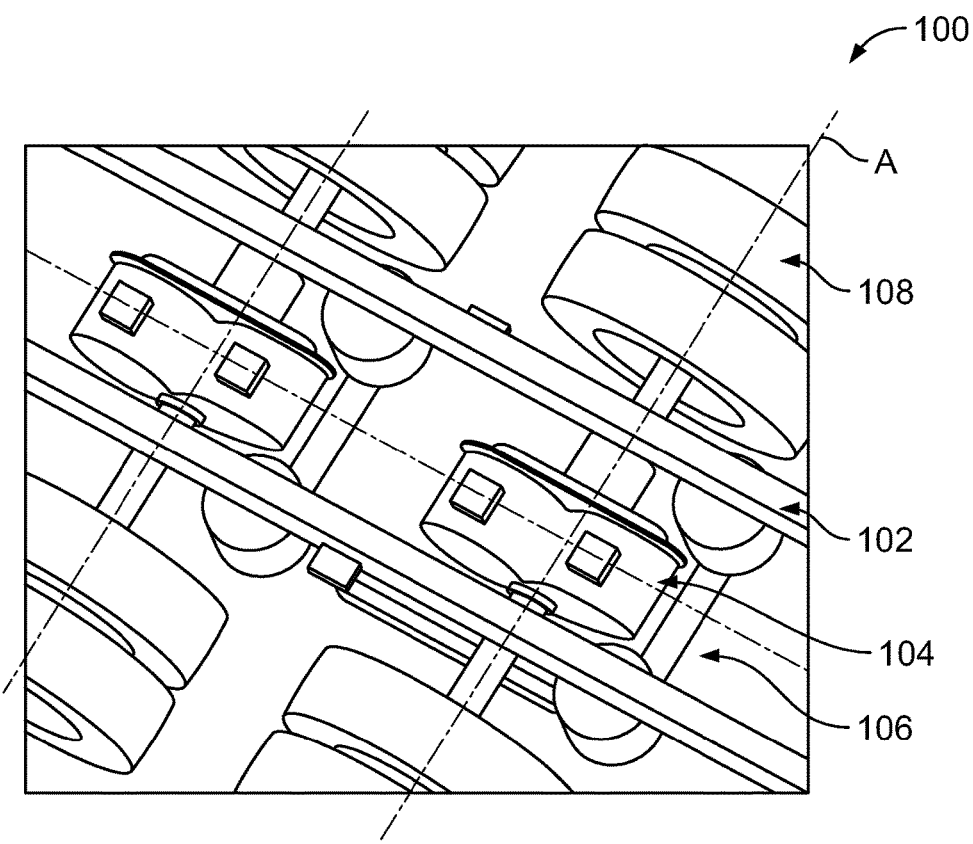
FIG. 1 is a partial top perspective view of a vehicle having a pair of electric axle assemblies in accordance with the present disclosure coupled to a frame by an axle mount and suggesting that the electric axle assembly drives rotation of wheels of the vehicle for moving the vehicle along a ground surface.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the disclosure as defined by the appended claims.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Figure 2:
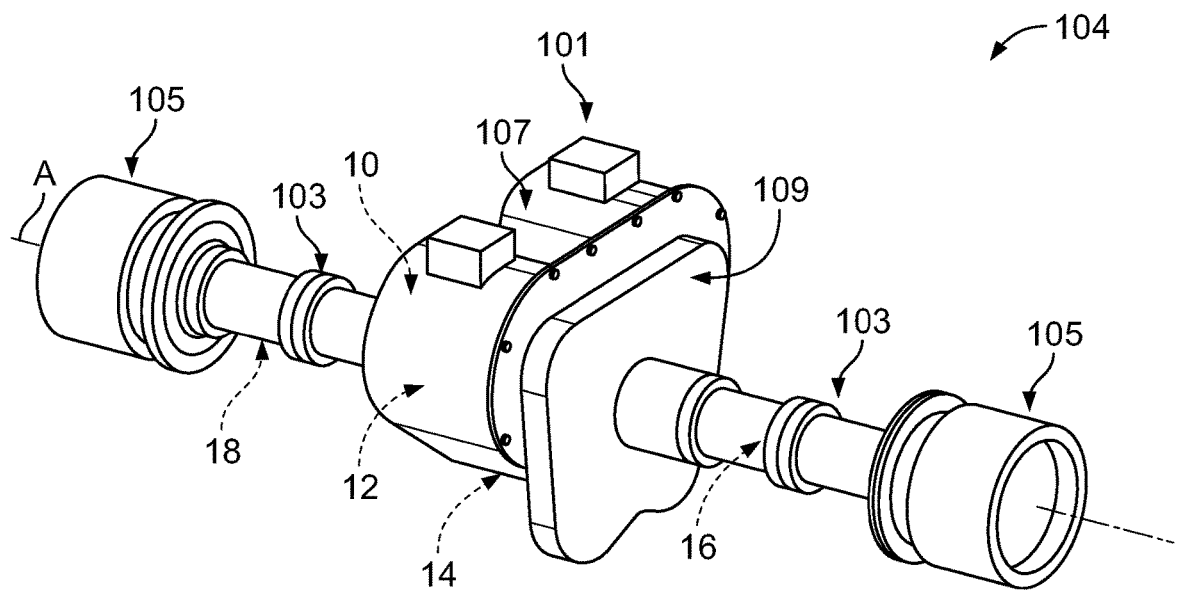
FIG. 2 is a right-side perspective view of the electric axle assembly of FIG. 1 showing that the electric axle assembly includes a drive housing, oppositely extending axle tubes coupled to the drive housing, and a drive assembly in accordance with the present disclosure and suggesting that a drive input and drivetrain of the drive assembly are housed in the drive housing and axle shafts of the drive assembly extend through the axle tubes to couple with wheel hubs.
Figure 3:
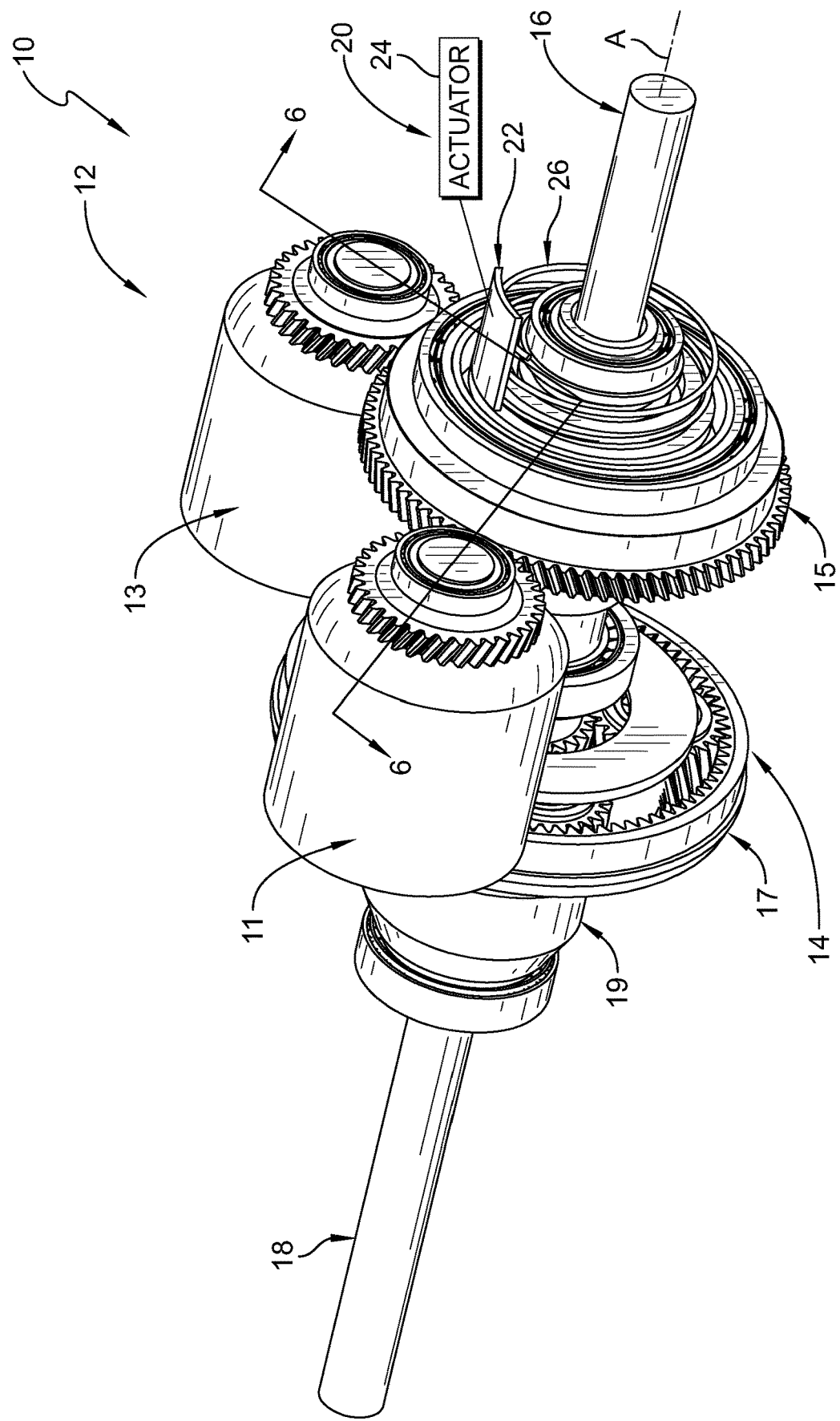
FIG. 3 is a right-side perspective view of an exemplary embodiment of a drive assembly in accordance with the present disclosure showing that a drivetrain of the drive assembly includes an input gearset coupled to an output gearset and suggesting that the input gearset transfers motive power from one or more drive units to the output gearset and that the output gearset transfers motive power received from the input gearset to a differential for driving rotation of axle shafts of the drive assembly.
Figure 4:
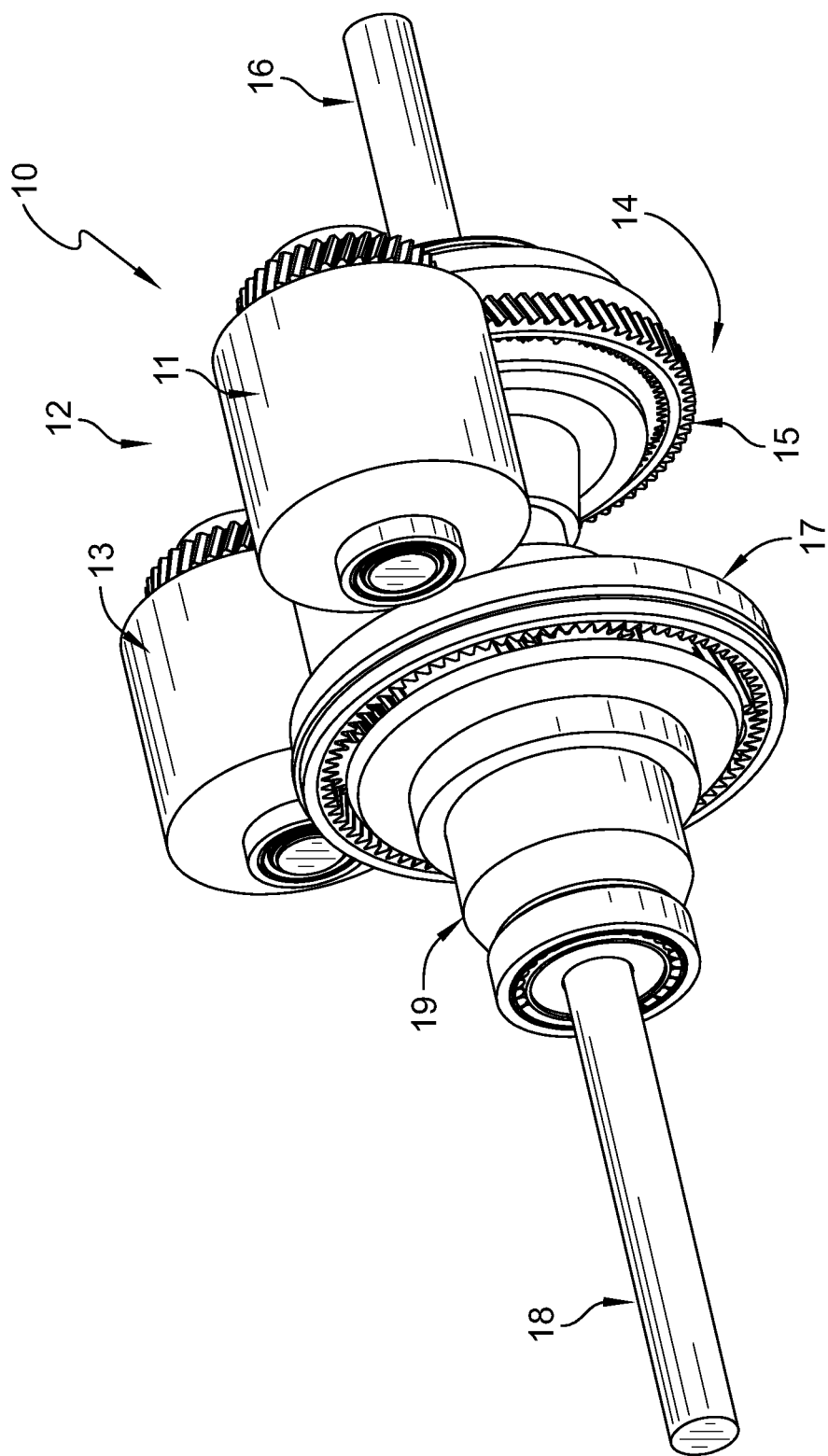
FIG. 4 is a left-side perspective view of the drive assembly of FIG. 3.

An illustrative vehicle 100, such as a semi truck, is shown in FIG. 1. The vehicle 100 includes a frame 102 and an electric axle assembly 104 coupled to the frame 102 by an axle mount 106, such as leaf springs. The electric axle assembly 104 is configured to drive rotation of wheels 108 about an axis A for movement of the vehicle 100 along a ground surface. The electric axle assembly 104 includes a drive housing 101 and oppositely extending axle tubes 103 coupled to the drive housing 101 as shown in FIG. 2. The drive housing 101 includes a body 107 and a cover 109 coupled to the body 107. One of the axle tubes 103 is coupled to the body 107 and the other axle tube 103 is coupled to the cover 109.

A drive assembly 10 in accordance with the present disclosure includes a drive input 12, a drivetrain 14, and axle shafts 16, 18 as shown in FIGS. 2-6. The drive input 12 and drivetrain 14 are housed in the drive housing 101, and the axle shafts 16, 18 extend through the axle tubes 103 to couple with wheel hubs 105 as suggested in FIG. 2. The wheels 108 are mounted on the wheel hubs 105 for rotation by the drive assembly 10.

In the illustrative embodiment, the drive input 12 of the drive assembly 10 includes first and second drive units 11, 13, such as electric motors, as shown in FIGS. 3-6. The drive units 11, 13 can be any type of electric motor commonly known in the art, such as synchronous or asynchronous motors, with or without brushes, and supplied with DC or AC power. The drive units 11, 13 can further be motor-generators that are capable of both outputting mechanical energy to propel the vehicle 100 as well as generating electrical energy to charge a battery or slow the vehicle 100. While two drive units 11, 13 are shown, more or less drive units can be used without departing from the present disclosure.

The drivetrain 14 includes an input gearset 15 and an output gearset 17 as shown in FIG. 3-6. The input gearset 15 is coupled to the output gearset 17 to transfer motive power from the drive units 11, 13 to the output gearset 17. The output gearset 17 is coupled to a differential 19, and the output gearset 17 transfers motive power received from the input gearset 15 to the differential 19 for driving rotation of the axle shafts 16, 18 about the axis A. The differential 19 allows the axle shafts 16, 18 to rotate at different speeds relative to one another.

Figure 6:
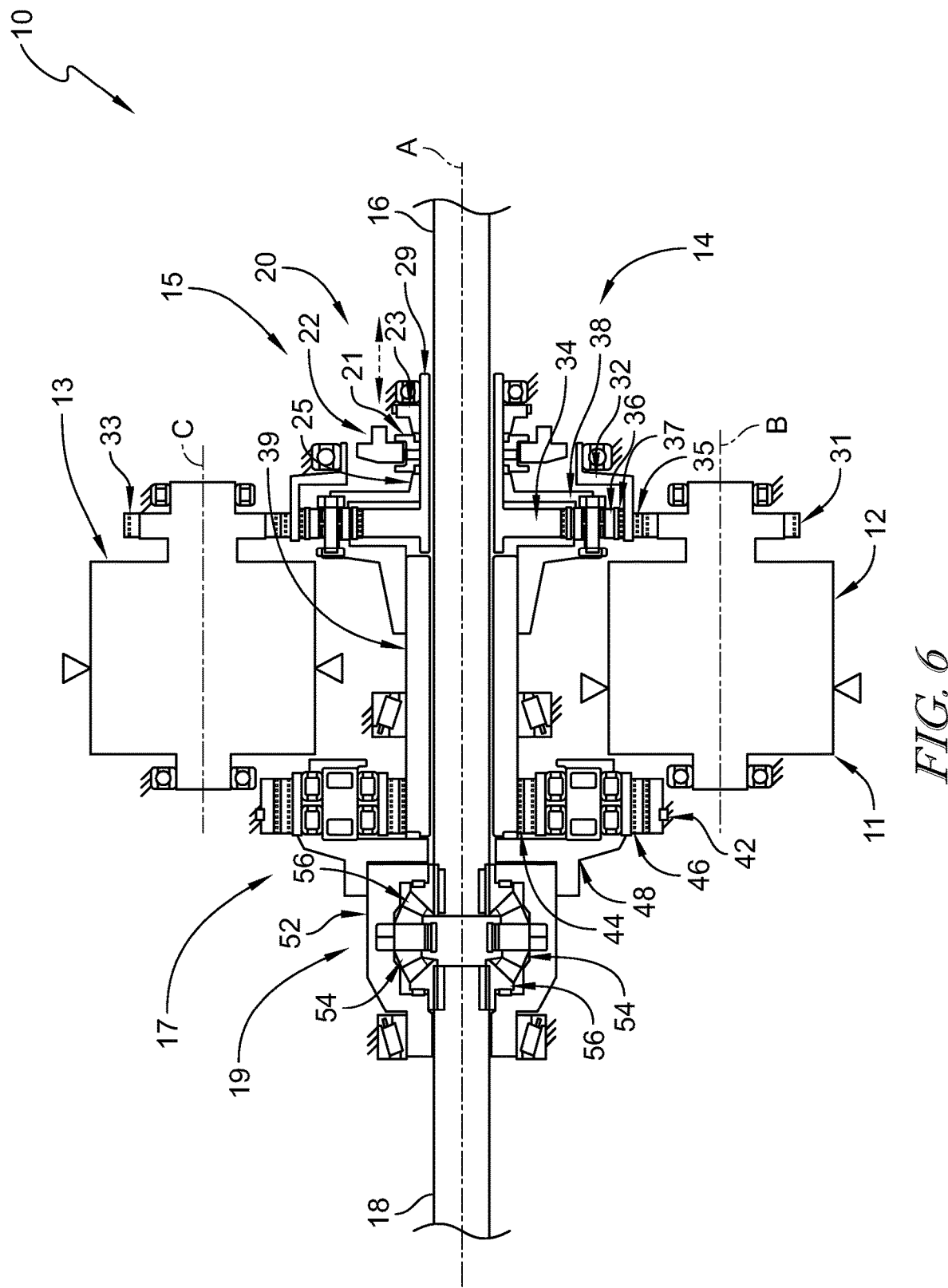
FIG. 6 is a sectional view taken along line 6-6 in FIG. 3 showing that the input gearset includes a drum, a sun gear, and one or more planet gears coupled to a carrier and suggesting that pinion gears coupled to the drive units engage with outer gear teeth of the drum and that the drum defines an inner ring gear for engaging with the planet gears.
Figure 7:
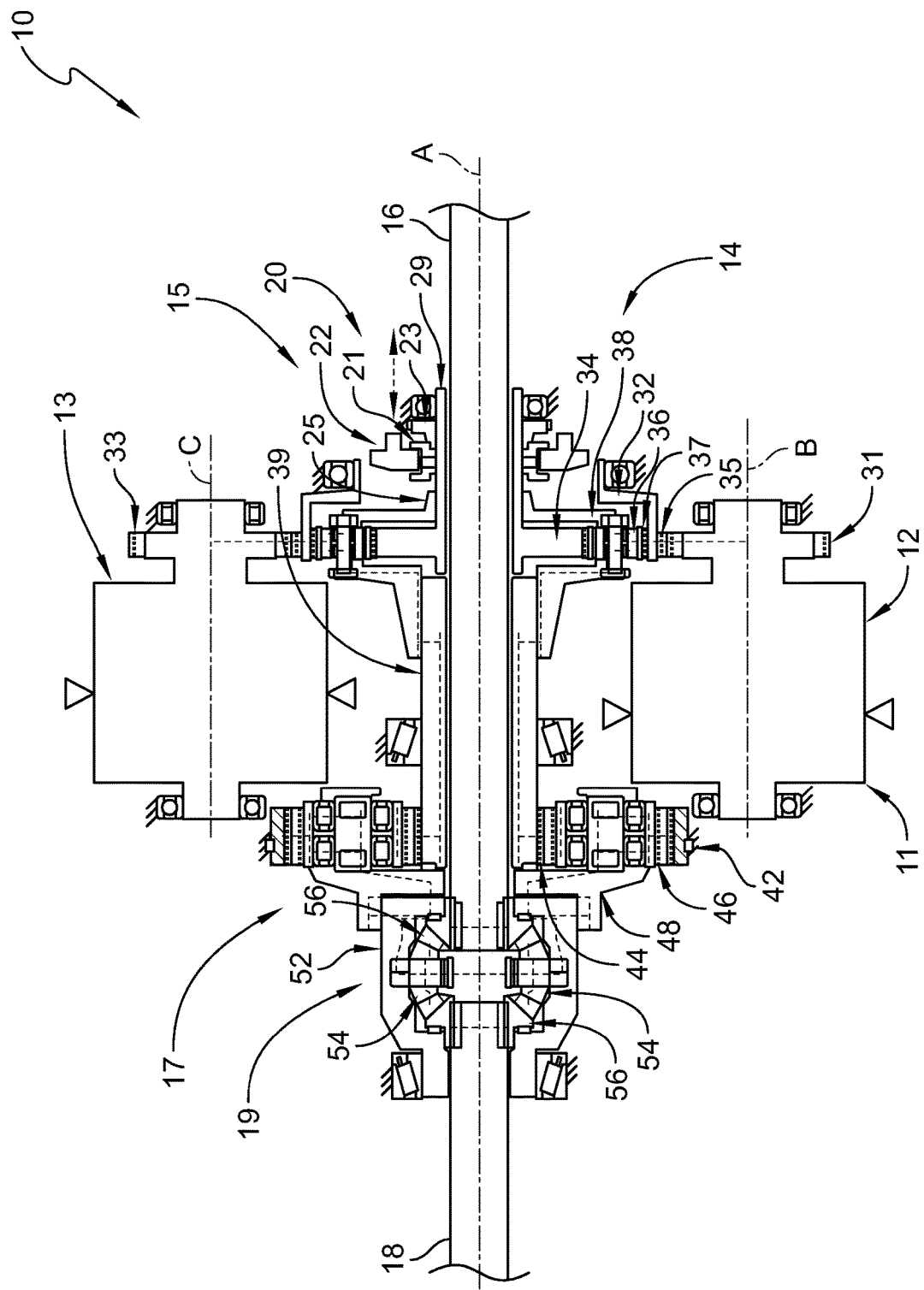
FIG. 7 is a view similar to FIG. 6 showing a path of power flow in a first gear ratio of the input gearset and suggesting that a clutch arrangement blocks rotation of the sun gear relative to the drive housing of the electric axle assembly to provide the first gear ratio.
Figure 8:
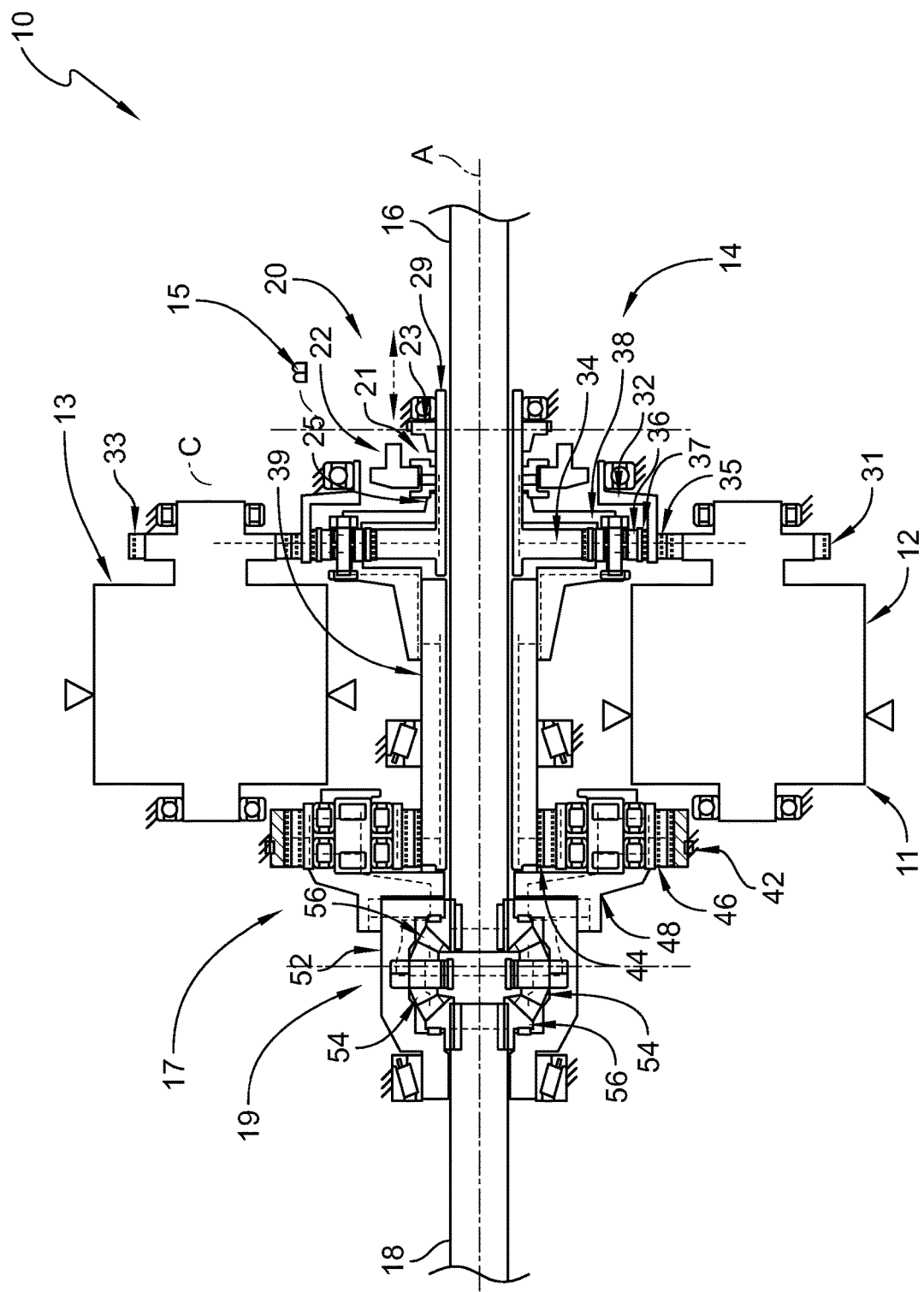
FIG. 8 is a view similar to FIG. 7 showing a path of power flow in a second gear ratio of the input gearset and suggesting that the clutch arrangement engages with the sun gear and the carrier for rotation of the sun gear and carrier together to provide the second gear ratio.

The input gearset 15 is configured to provide multiple, selectable gear ratios for driving rotation of axle shafts 16, 18 by the drive input 12 as suggested in FIGS. 7 and 8. For example, in a first configuration, the input gearset 15 provides a first gear ratio allowing increased torque from the drive units 11, 13 to be transmitted to the axle shafts 16, 18, at the expense of speed, allowing the vehicle to accelerate more quickly. In a second configuration, the input gearset 15 provides a second gear ratio allowing increased rotational speed of the axle shafts 16, 18, at the expense of torque, allowing the vehicle to reach a higher velocity. A clutch arrangement 20 includes a shift collar 21 (FIGS. 5-11) coupled to a shift fork 22 and an actuator 24 coupled to the shift fork 22 for movement of the shift fork 22 to select the various gear ratios of the input gearset 15 with the shift collar 21 as further detailed below. In some embodiments, a biasing member 26, such as a coil or helical spring, engages with the drive housing 101 and the shift fork 22 to bias the shift fork 22 toward the input gearset 15.

Figure 5:
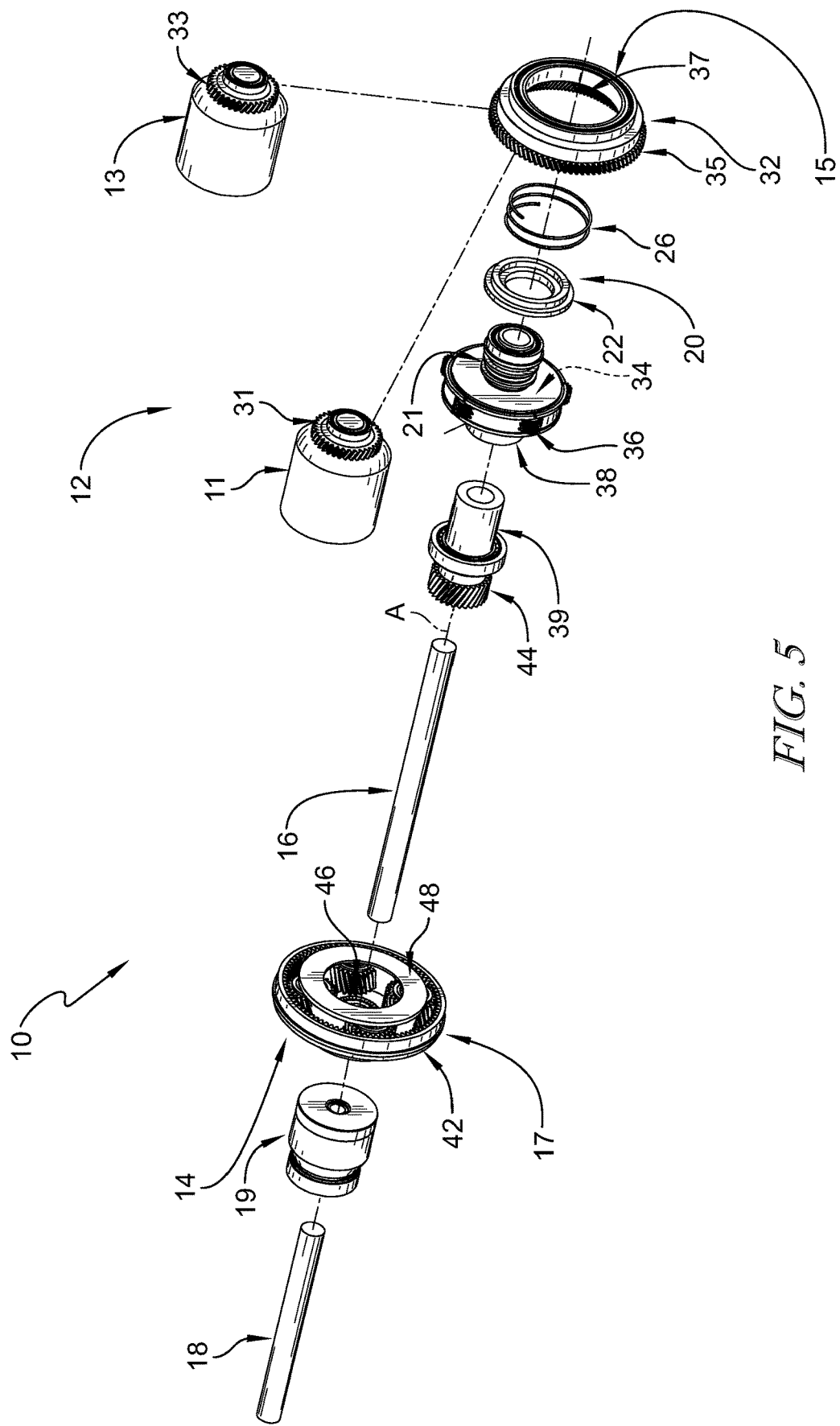
FIG. 5 is an exploded assembly view of the drive assembly of FIG. 3.
Figure 9:
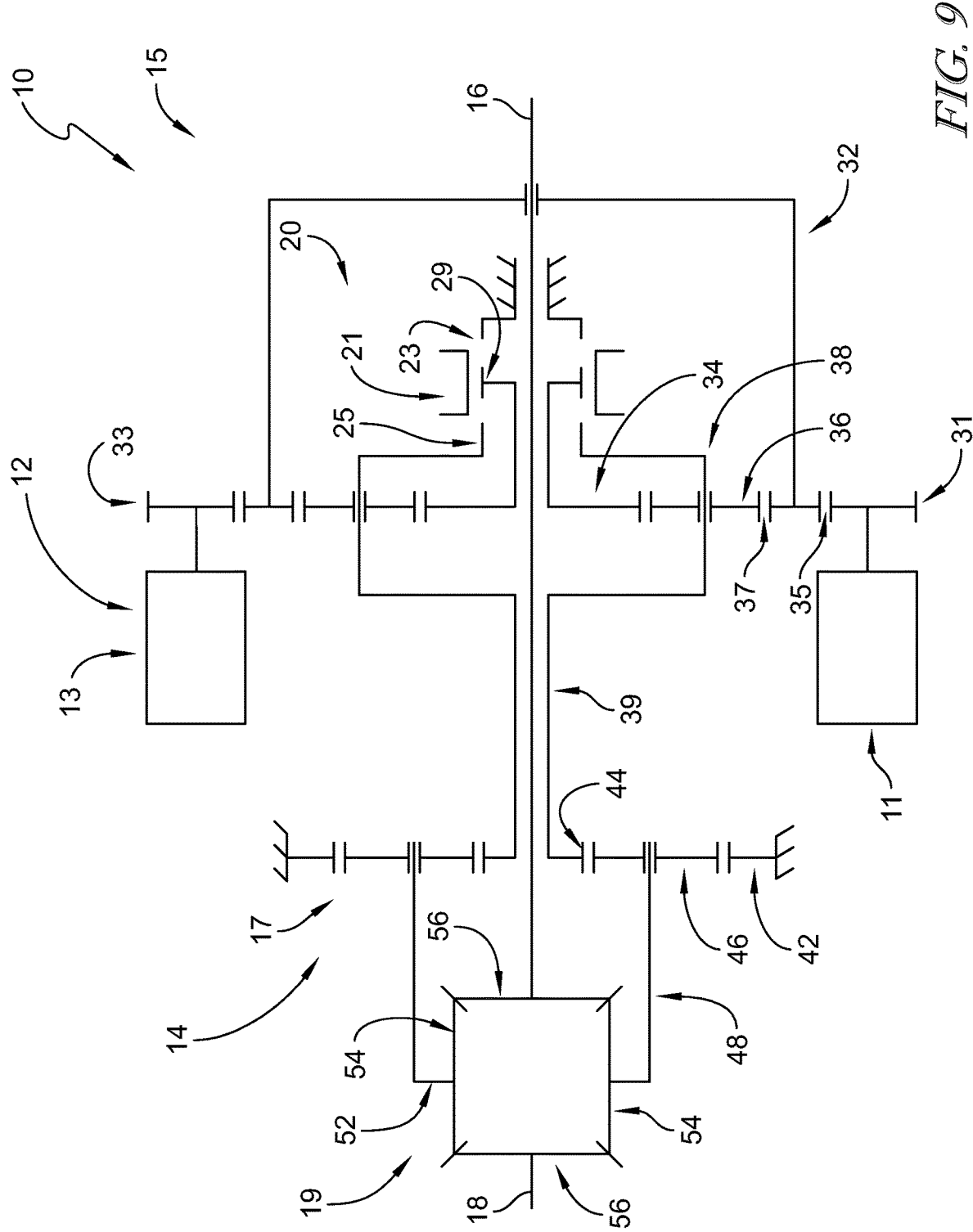
FIG. 9 is a diagrammatic view of the drive assembly of FIG. 6.

The input gearset 15 is arranged for rotation around the axis A as shown in FIGS. 5 and 6. The input gearset 15 includes a drum 32, a sun gear 34, one or more planet gears 36, and a carrier 38 as shown in FIGS. 5, 6, and 9. The drum 32 is arranged radially outward of the planet gears 36 and carrier 38, which are arranged radially outward of the sun gear 34. In the illustrative embodiment, the drum 32 defines a radially outward facing input gear 35 and a radially inward facing ring gear 37. The drive units 11, 13 are configured to selectively rotate pinion gears 31, 33, respectively. The pinion gear 31 rotates about an axis B offset from the axis A, and the pinion gear 33 rotates about an axis C offset from the other axes A, B. The pinion gears 31, 33 are engaged with the input gear 35 of the drum 32 and the ring gear 37 is engaged with the one or more planet gears 36.

Figure 10:
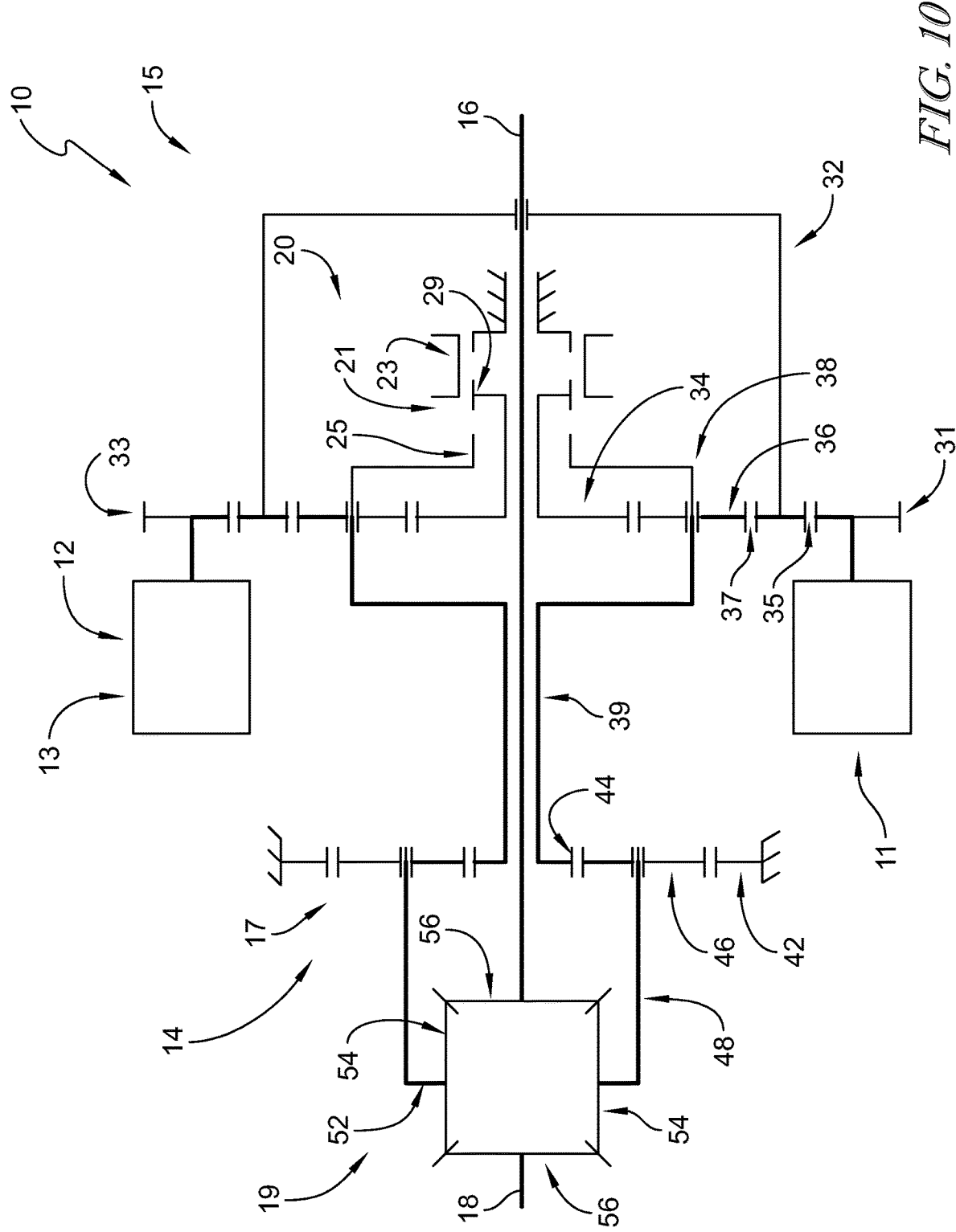
FIG. 10 is a diagrammatic view of the drive assembly of FIG. 7.

The clutch arrangement 20 includes the shift collar 21 movable by the shift fork 22 relative to the input gearset 15 as shown in FIGS. 5, 6, and 9. The shift collar 21 is coupled to a splined extension 29 of the sun gear 34 allowing the shift collar 21 to rotate with the sun gear 34 and slide along the splined extension 29. The shift collar 21 is rotatable relative to the shift fork 22. The shift collar 21 is engageable with a set of dog teeth 23 defined on a stationary component (e.g., a portion of the drive housing 101) and a set of dog teeth 25 defined by the carrier 38. The shift collar 21 is shown in a neutral position disengaged from both sets of dog teeth 23, 25 in FIG. 6. In the illustrative embodiment, the actuator 24 (FIG. 3) moves the shift fork 22 to move the shift collar toward the dog teeth 23 for selecting the first gear ratio of the input gearset 15 as shown in FIGS. 7 and 10. The actuator 24 (FIG. 3) moves the shift fork 22 to move the shift collar toward the dog teeth 25 for selecting the second gear ratio of the input gearset 15 as shown in FIGS. 8 and 11.

In the first gear ratio of the input gearset 15, the shift collar 21 is engaged with the dog teeth 23 to block rotation of the sun gear 34 relative to the axis A as shown in FIGS. 7 and 10. The drive units 11, 13 rotate the pinion gears 31, 33, respectively, to engage with the input gear 35 and rotate the drum 32 about the axis A. The ring gear 37 engages with the one or more planet gears 36 to move the planet gears 36 relative to the sun gear 34 around the axis A. Movement of the planet gears 36 rotates the carrier 38 about the axis A. A power path through the drivetrain 14 in the first gear ratio is shown by the dashed line in FIG. 7 and the thick line in FIG. 8.

Figure 11:
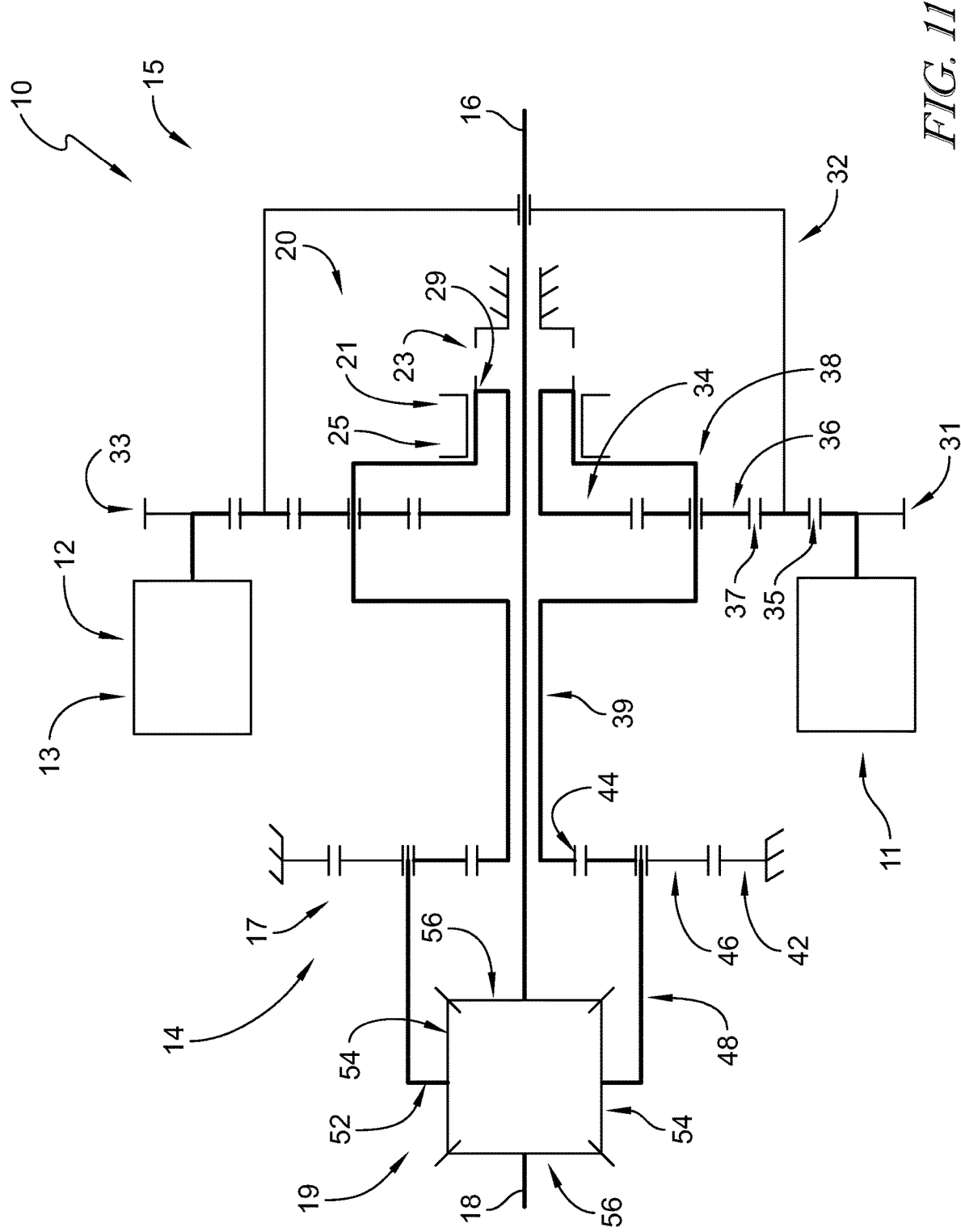
FIG. 11 is a diagrammatic view of the drive assembly of FIG. 8.

In the second gear ratio of the input gearset 15, the shift collar 21 is engaged with the dog teeth 25 to rotate the sun gear 34 and carrier 38 together about the axis A as shown in FIGS. 8 and 11. The drive units 11, 13 rotate the pinion gears 31, 33, respectively, to engage with the input gear 35 and rotate the drum 32 about the axis A. Engagement of the one or more planet gears 36 with the sun gear 34 and the ring gear 37 causes the sun gear 34 and carrier 38 to rotate with the drum 32 about the axis A. A power path through the drivetrain 14 in the second gear ratio is shown by the dashed line in FIG. 8 and the thick line in FIG. 11.

A transfer tube 39 is coupled for rotation with the carrier 38 of the input gearset 15 and extends toward the output gearset 17 as shown in FIGS. 5, 6, and 9. In the illustrative embodiment, the transfer tube 39 is formed to define a sun gear 44 of the output gearset 17. The output gearset 17 includes a stationary ring gear 42, the sun gear 44, one or more planet gears 46, and a carrier 48. The one or more planet gears 46 are engaged with the ring gear 42 and sun gear 44. Rotation of the sun gear 44 (with rotation of the input gearset 15 and transfer tube 39) moves the one or more planet gears 46 around the axis A and rotates the carrier 48 about the axis A.

In the illustrative embodiment, the differential 19 is as an "open" differential and includes a case 52, spider gears 54 coupled for rotation with the case 52, and side gears 46 coupled the axle shafts 16, 18 as shown in FIGS. 6 and 9. The case 52 is coupled to the carrier 48 of the output gearset 17 for rotation with the carrier 48. Rotation of the case 52 moves the spider gears 54 around the axis A. The spider gears 54 engage with the side gears 46 to rotate the axle shafts 16, 18 with rotation of the case 52. The spider gears 54 are also rotatable relative to the case 52 to allow relative differences in rotational speed between the axle shafts 16, 18 to prevent wheel drag during turning of the vehicle.

As contemplated by the present disclosure, in some embodiments, the output gearset 17 can rotate the axle shafts 16, 18 without the use of the differential 19, or with differentials having other configurations. For example, the output gearset 17 can be directly coupled to the axle shafts 16, 18. Alternatively, the differential 19 can be "locking", "torque biasing", "limited slip", or another type of differential. In some embodiments, the input gearset 15 can rotate the axle shafts 16, 18 without the use of the output gearset 17 and/or differential 19. For example, the input gearset 15 can be coupled to the differential 19 for rotating the axle shafts 16, 18. Alternatively, the input gearset 15 can be directly coupled to the axle shafts 16, 18. In some embodiments, one or both of the input and output gearsets 15, 17 provide selectable gear ratios using one or more clutch arrangements.

In the illustrative embodiment, the input gearset 15 and output gearset 17 can provide a gear reduction (e.g., mechanical advantage) to increase the applied torque from the drive input 12 to the axle shafts 16, 18 as suggested in FIG. 6. For example, in the first gear ratio of the input gearset 15, relatively smaller planet gears 36 move around a relatively larger sun gear 34 providing a first gear reduction. In the output gearset 17, a relatively smaller sun gear 44 moves relatively larger planet gears 46 providing a second gear reduction. Other combinations, sizes, and aspects of the relative size and position of the components in the input gearset 15 and/or output gearset 17 are contemplated by the present disclosure.

In illustrative embodiments, an electric axle assembly 104 is disclosed for use with a vehicle 100 such as, for example, a body-on-frame truck. Wheels 108 are arranged at opposing ends of the electric axle assembly 104 to support the vehicle for conveyance along a ground surface. The electric axle assembly 104 propels the vehicle by transferring motive power to the wheels 108 in contact with the ground surface.

In illustrative embodiments, the vehicle includes a chassis upon which a body and other equipment can be supported. For example, a cab, a cargo box, a lift boom, or a hitch system can be mounted to the chassis. The chassis includes frame rails; suspension components such as springs, dampers, and trailing arms; and brake components such as air cylinders, brake calipers, brake rotors, brake drums, brake hoses, and the like. The electric axle assembly 104 is generally mounted perpendicular to the frame rails such that the vehicle travels in a direction aligned with the frame rails.

In illustrative embodiments, the electric axle assembly 104 can be configured for "single-wheel" applications and "dual-wheel" applications. In "single-wheel" applications a single wheel is coupled to each end of the electric axle assembly 104. Likewise, in "dual-wheel" applications, wheels are arranged in pairs at each end of the electric axle assembly 104. Vehicles requiring increased payload or towing capacity are one example of a "dual-wheel" application. Vehicles that require a further increased payload/towing capacity can be equipped with two or more electric axle assemblies 104. Some vehicles can require drive devices other than wheels. For example, crawler tracks or rail wheels can be coupled to the electric axle assembly 104 to propel the vehicle. The electric axle assembly 104 can be mounted to the vehicle in the front and in the rear to realize various drive types such as front-wheel drive, rear-wheel drive, and all/four-wheel drive.

In illustrative embodiments, vehicle performance is optimized when the wheels are in constant contact with the ground. In order to more easily follow the ground, a suspension system movably couples the electric axle assembly 104 to the frame rails. The suspension system allows the electric axle assembly 104 to move relative to the frame rails and urges the wheels toward the ground when the vehicles encounters imperfections in the ground. The suspension system can include springs, air bags, and dampers, which absorb movement and improve ride quality; control arms that constrain the movement of the electric axle assembly 104, and other elements as determined by the application such as steering and kinematic linkages. The electric axle assembly 104 can also be mounted to a vehicle that was not originally equipped with an electric axle assembly 104. The electric axle assembly 104 can be retrofit to these vehicles to offer an electric driveline upgrade and can be used in combination with an internal combustion engine wherein the electric axle assembly 104 is used to drive one set of wheels and the internal combustion engine drives a second set of wheels.

In illustrative embodiments, the electric axle assembly 104 can be utilized in both hybrid-electric and fully-electric vehicles. In a fully-electric vehicle, electricity to power the electric axle assembly 104 can be stored in a battery mounted to the chassis. Alternatively, electricity can be supplied from an external power source, such as an overhead wire or third rail system. If the vehicle is configured as a hybrid-electric vehicle, an internal combustion engine can be mounted to the chassis and coupled to an electric drive unit capable of generating electricity; the electricity can power the electric axle assembly 104 directly, or can be stored in a battery.

In illustrative embodiments, the electric axle assembly 104 generally includes a center section (or drive housing) and two axle tubes. A first axle tube is coupled to a first side of the center section and a second axle tube is coupled to a second side of the center section such that each axle tubes extend outwardly from the center section in opposite directions along a rotation axis A. The electric axle assembly 104 can further include two wheel ends, each coupled to one of the axle tubes. Each axle tube is coupled to the center section at a proximal end and to one of the wheel ends at a distal end. It should be appreciated that the center section, axle tubes, and wheel ends can be constructed and coupled in a variety of ways commonly known in the art. In one example, the center section can include one or more castings that are assembled together using fasteners, the axle tubes can be forgings that are coupled to the center section using fasteners, and each wheel end can be integrally formed at the distal end of the axle tubes. In another example, the axle tubes can be pressed and/or welded to the center section and each wheel end can be coupled to the axle tubes using fasteners. In yet another example, the center section and axle tubes can be fabricated from two halves defined along an axis generally parallel to the axis A; each half including a portion of the center section and a portion of each axle tube.

In illustrative embodiments, the wheel ends rotatably support each of the wheels and a corresponding axle shaft 16, 18. Each axle shaft 16, 18 is disposed in one of the axle tubes and generally coaxial with the axis A. The wheel ends can be full-float wheel hubs, semi-float wheel hubs, planetary reduction hubs, or portal hubs. As will be discussed in further detail below, the axle shafts 16, 18 transfer torque to the wheels to drive the vehicle.

In illustrative embodiments, the gear train or drivetrain 14 has an input or input gearset 15 and an output or output gearset 17. The input 15 receives torque from the drive input 12, and the output 17 provides torque to the axle shafts 16, 18. In order to improve launch and velocity performance of the vehicle, at least one of the input gearset 15 and output gearset 17 is shiftable between a first ratio and a second ratio. In the first ratio, the gear train 14 increases the torque at the output 17, at the expense of speed, allowing the vehicle to accelerate more quickly. Likewise, in the second ratio, the gear train 14 increases the maximum speed of output 17, at the expense of torque, allowing the vehicle to reach a higher velocity. The electric axle assembly 104 includes a shift mechanism or clutch arrangement 20 to selectively engage either the first ratio or the second ratio.

In illustrative embodiments, the drive input 12 includes a first electric drive unit 11 and a second electric drive unit 13. Each electric drive unit 11, 13 includes a rotor shaft protruding from one end, and a drive pinion 31, 33 fixed to the rotor shaft. Each of the rotor shafts defines a rotor axis B, C that extends through the respective electric drive unit 11, 13. Each electric drive unit 11, 13 is oriented in the same direction and in parallel alignment such that each rotor axis B, C is parallel to the other and parallel to the axis A. The first and second drive units 11, 13 are arranged with the second electric drive unit 11 positioned rearward of the first electric drive unit 13 along a longitudinal axis of the vehicle.

In illustrative embodiments, the gear train 14 includes an input gearset 15, an output gearset 17, and a differential 19. Torque generated in the drive units 11, 13 is transferred into the input gearset 15. Rotation of the input gearset 15 is transferred at the first ratio or the second ratio to the output gearset 17, which rotates the differential 19. The input gearset 15 is schematically arranged between the drive units 11, 13 and the output gearset 17 such that power from the drive units 11, 13 travels from the input gearset 15 to the output gearset 17.

In illustrative embodiments, an input drum 32 is supported in the center section for rotation about the axis A. An input ring 35 is concentrically fixed to the input drum 32 for concurrent rotation about the axis A. The input ring 35 has external gear teeth that protrude radially outwardly from the axis A. The drive pinions 31, 33, being coaxial with the rotor axes B, C spaced from the axis A at a radius permitting engagement with the teeth of the input ring 35, rotate the input ring 35 and the input drum 32. The input drum 32 defines a cavity in which the remainder of the input gearset 15 is disposed.

In illustrative embodiments, a driving ring gear 37, a reduction sun gear 34, a reduction carrier 38, and a plurality of reduction planet gears 36 are arranged in a planetary configuration. The driving ring gear 37 has internal gear teeth that protrude radially inwardly toward the axis A and engage with the reduction planet gears 36. The driving ring gear 37 is concentrically fixed to the input drum 32 for concurrent rotation about the axis A. The reduction planet gears 36 are rotatably supported on the reduction carrier 38 and radially arranged about the reduction sun gear 34. The driving ring gear 37 circumscribes the reduction planet gears 36 and the reduction sun gear 34 such that the reduction planet gears 36 simultaneously engage both the driving ring gear 37 and the reduction sun gear 34. As will be discussed in further detail below, rotation of the driving ring gear 37 drives the reduction planetary gears 36 to roll against the reduction sun gear 34 and orbit the axis A causing the reduction carrier 38 to rotate.

In illustrative embodiments, the output gearset 17 includes an output ring gear 42, a plurality of output planet gears 46, an output sun gear 44, and an output carrier 48. The output ring gear 42 is rotatably fixed to the center section and has internal gear teeth that protrude radially inwardly toward the axis A. Each of the output planet gears 46 is radially arranged about the output sun gear 44, and supported by the output carrier 48, to engage with the output sun gear 44 and the output ring gear 46. Rotation of the output sun gear 44 drives the output planet gears 46 to roll against the output ring gear 46 and orbit the axis A causing the output carrier 48 to rotate.

In illustrative embodiments, the gear train 14 further includes an intermediate shaft or transfer tube 39 shown schematically between the input gearset 15 and the output gearset 17. The intermediate shaft 39 is coupled to the reduction carrier 38 at a first end and to the output sun gear 44 at a second end and transfers torque and rotation from the input gearset 15 to the output gearset 17. More specifically, the first end of the intermediate shaft 39 is coupled to the reduction carrier 38 and the second end of the intermediate shaft 39 is coupled to the output sun gear 44. Rotation of the reduction carrier 48 is transferred to the intermediate shaft 39 rotating the output sun gear 44.

In illustrative embodiments, the gear train 14 further includes the differential 19 coupled to each of the axle shafts 16, 18. The differential 19 transfers rotation from the output gearset 17 to the axle shafts 16, 18 while allowing a relative difference in speed between each axle shaft 16, 18. The differential 19 includes a differential case 52, spider gears 54 coupled to the differential case 52, and a pair of side gears 56 engaged with the spider gears 54 and each coupled to one of the axle shafts 16, 18. The differential case 52 is coupled to the output carrier 48 for rotation about the axis A. Rotation of the differential case 52 transfers rotation to the side gears 56 and to the axle shafts 16, 18, thereby rotating the wheels.

In illustrative embodiments, the electric axle assembly 104 is shiftable between the first ratio and the second ratio. The shift mechanism 20 includes a shift collar 21, a shift fork 22, and an actuator 24. The shift collar 21 is rotatably coupled to the reduction sun gear 34 via a splined shaft 29 such that the shift collar 21 and the reduction sun gear 34 rotate at the same speed. The shift collar 21 is slidable along the splined shaft 29 between the first ratio and the second ratio. The shift fork 22 is operably coupled to the actuator 24 and to the shift collar 21 such that movement of the actuator 24 moves the shift fork 22 to slide the shift collar 21 along the splined shaft 29.

In illustrative embodiments, the shift collar 21 is engagable with the center section and the reduction carrier 38 to place the gear train 14 in either the first ratio or the second ratio, respectively. The shift collar 21 and each of the center section and the reduction carrier 38 includes mating engagement features 23, 25 that, when engaged, rotatably couple the reduction sun gear 34 to the center section or the reduction carrier 38. The engagement features can include splines, an interference clutch, a friction clutch, a brake, and a synchronizer to aid shifting.

In illustrative embodiments, in the first ratio, the shift collar 21 is engaged with the center section such that the reduction sun gear 34 is rotatably fixed to the center section. Here, the reduction sun gear 34 does not rotate in response to rotation of the input ring 35. The drive units 11, 13 rotate the input ring 35, input drum 32, and the driving ring gear 37. The driving ring gear 37 turns the reduction planet gears 36, which roll around the reduction sun gear 34. The reduction planet gears 36 cause the reduction carrier 38 to rotate about the axis A at a speed slower than the input ring 35.

In illustrative embodiments, in the second ratio, the shift collar 21 is engaged with the reduction carrier 38 such that the reduction sun gear 34 is rotatably fixed to the reduction carrier 38. Here, rotation of the reduction sun gear 34 is locked to the reduction carrier 38, which causes the reduction set 34 to rotate as a unitary gear. More specifically, the drive units 11, 13 rotate the input ring 35, input drum 32 and the driving ring gear 37. Rotation of the driving ring gear 37 is transferred to the reduction planet gears 36, which are prevented from rolling around the reduction sun gear 34 causing the reduction carrier 38 and the reduction sun gear 34 to rotate at the same speed as the driving ring gear 37.

In illustrative embodiments, the shift fork and shift collar 21 can be movable into a neutral position in which the shift collar 21 is engaged with neither the reduction carrier 38 nor the center section. Generally, the neutral position is used to decouple the drive units 11, 13 from the gear train 14 and allow the wheels to rotate without rotating the rotor shafts of the drive units 11, 13. When the vehicle is able to freewheel, or coast, energy required to rotate the rotor shafts 11, 13 is saved. In the neutral position the reduction carrier 38, the reduction sun gear 34, and the driving ring gear 37 are able to rotate about the axis A independently. In the scenario where the vehicle is coasting, rotation of the axle shafts 16, 18 is transferred to the reduction carrier 38 causing the reduction planet gears 36 to roll around the driving ring gear 37. Following the path of least resistance, the reduction planet gears 36 cause the reduction sun gear 34 to rotate while the driving ring gear 37 remains stationary.

In illustrative embodiments, the actuator 24 can be controlled manually or automatically. The actuator 24 can be responsive to hydraulic pressure, pneumatic pressure, or electronic signals generated by a control module. Alternatively, the actuator 24 can include a mechanical linkage controlled by an operator. The gear train 14 and gears described above can be configured with various gear types as necessary. Gear types can include spur gears with straight teeth, helical gears, and other types known in the art.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

The invention claimed is:

1. A drive assembly for an electric axle assembly of a vehicle, the drive assembly comprising:
a drive input including a first electric drive unit and a second electric drive unit spaced apart from the first electric drive unit;
an input gearset arranged for rotation about an axis, the input gearset having a first configuration providing a first gear ratio and a second configuration providing a second gear ratio different from the first gear ratio;
an output gearset arranged for rotation about the axis and spaced apart along the axis from the input gearset;
a differential coupled to the output gearset;
a clutch arrangement configured to engage with the input gearset to move the input gearset between the first configuration and the second configuration; and
first and second axle shafts coupled to the differential and arranged for rotation about the axis,
wherein each of the first and second electric drive units is offset from the axis and includes a pinion gear engaged with a common input gear of the input gearset to selectively apply motive force to the input gearset, the input gearset is configured to transfer the motive force received from the first and second electric drive units to the output gearset, the output gearset is configured to transfer the motive force received from the input gearset to the differential, and the differential is configured to transfer the motive force received from the output gearset to the first and second axle shafts.

2. The drive assembly of claim 1, wherein the input gearset includes a radially outer input gear arranged for engagement by the drive input, a radially inner ring gear coupled to the radially outer input gear, a sun gear positioned radially inward of the ring gear, at least one planet gear arranged between the ring gear and the sun gear, and a carrier coupled to the at least one planet gear for rotation with the planet gear.

3. The drive assembly of claim 2, wherein, in the first configuration, the sun gear is rotatably fixed relative to the axis and the planet gears move around the sun gear with rotation of the radially outer input gear, and wherein, in the second configuration, the sun gear and the carrier are fixed together for rotation about the axis with rotation of the radially outer input gear by the drive input.

4. The drive assembly of claim 3, wherein the clutch arrangement includes a shift collar rotatably fixed relative to the sun gear, a shift fork coupled to the shift collar, and an actuator, wherein the actuator is configured to move the shift fork for movement of the shift collar relative to the input gearset, and wherein the shift collar is configured to engage with a stationary component to provide the first configuration of the input gearset and to engage with the carrier to provide the second configuration of the input gearset.

5. The drive assembly of claim 1, wherein one of the first and second axle shafts extends through the input gearset.

6. The drive assembly of claim 5, wherein one of the first and second axle shafts extends through the output gearset.

7. The drive assembly of claim 1, wherein the output gearset includes a ring gear, a sun gear positioned radially inward of the ring gear, at least one planet gear arranged between the ring gear and the sun gear, and a carrier coupled to the at least one planet gear for rotation with the planet gear.

8. The drive assembly of claim 7, further comprising a transfer tube coupled to the input gearset and extending toward the output gearset, and wherein the sun gear is coupled to the transfer tube.

9. An electric axle assembly for use in a vehicle, the axle assembly comprising:

a drive housing and first and second axle tubes that extend from opposite sides of the drive housing; and
a drive assembly comprising:
a drive input including a first electric drive unit and a second electric drive unit, wherein each of the first and second electric drive units is positioned within the drive housing;
an input gearset positioned within the drive housing and arranged for rotation about an axis, the input gearset including an input gear;
an output gearset positioned within the drive housing and arranged for rotation about the axis and spaced apart along the axis from the input gearset;
a differential coupled to the output gearset; and
first and second axle shafts extending into the first and second axle tubes, the first and second axle shafts coupled to the differential and arranged for rotation about the axis,
wherein each of the first and second electric drive units is offset from the axis and includes a pinion gear engaged with the input gear of the input gearset to selectively apply motive force to the input gearset, the input gearset is configured to transfer the motive force received from the first and second electric drive units to the output gearset, the output gearset is configured to transfer the motive force received from the input gearset to the differential, and the differential is configured to transfer the motive force received from the output gearset to the first and second axle shafts.

10. The electric axle assembly of claim 9, wherein the input gearset includes a first configuration providing a first gear ratio and a second configuration providing a second gear ratio different from the first gear ratio.

11. The electric axle assembly of claim 10, further comprising a clutch arrangement configured to engage with the input gearset to move the input gearset between the first configuration and the second configuration.

12. The electric axle assembly of claim 11, wherein the input gearset includes a radially outer input gear arranged for engagement by the drive input, a radially inner ring gear coupled to the radially outer input gear, a sun gear positioned radially inward of the ring gear, at least one planet gear arranged between the ring gear and the sun gear, and a carrier coupled to the at least one planet gear for rotation with the planet gear.

13. The electric axle assembly of claim 12, wherein, in the first configuration, the sun gear is rotatably fixed relative to the axis and the planet gears move around the sun gear with rotation of the radially outer input gear, and wherein, in the second configuration, the sun gear and the carrier are fixed together for rotation about the axis with rotation of the radially outer input gear by the drive input.

14. The electric axle assembly of claim 13, wherein the clutch arrangement includes a shift collar rotatably fixed relative to the sun gear, a shift fork coupled to the shift collar, and an actuator, wherein the actuator is configured to move the shift fork for movement of the shift collar relative to the input gearset, and wherein the shift collar is configured to engage with a stationary component to provide the first configuration of the input gearset and to engage with the carrier to provide the second configuration of the input gearset.

15. The drive assembly of claim 9, wherein one of the first and second axle shafts extends through the input gearset.

16. The drive assembly of claim 15, wherein one of the first and second axle shafts extends through the output gearset.

17. The drive assembly of claim 9, wherein the output gearset includes a ring gear, a sun gear positioned radially inward of the ring gear, at least one planet gear arranged between the ring gear and the sun gear, and a carrier coupled to the at least one planet gear for rotation with the planet gear.

18. The drive assembly of claim 17, further comprising a transfer tube coupled to the input gearset and extending toward the output gearset, and wherein the sun gear is coupled to the transfer tube.

19. A vehicle comprising:
a frame; and
an electric axle assembly coupled to the frame, the electric axle assembly comprising:
a drive housing and first and second axle tubes that extend from opposite sides of the drive housing; and
a drive assembly comprising:
a drive input positioned within the drive housing, the drive input including a first electric drive unit and a second electric drive unit spaced apart from the first electric drive unit;
an input gearset positioned within the drive housing and arranged for rotation about an axis;
an output gearset positioned within the drive housing and arranged for rotation about the axis and spaced apart along the axis from the input gearset;
a differential coupled to the output gearset; and
first and second axle shafts extending into the first and second axle tubes, the first and second axle shafts coupled to the differential and arranged for rotation about the axis,
wherein each of the first and second electric drive units is offset from the axis and configured to selectively apply motive force to an input gear of the input gearset, the input gearset is configured to transfer the motive force received from the first and second electric drive units to the output gearset, the output gearset is configured to transfer the motive force received from the input gearset to the differential, the differential is configured to transfer the motive force received from the output gearset to the first and second axle shafts, and the first and second axle shafts are configured to transfer the motive force received from the differential to wheels of the vehicle for moving the vehicle along a ground surface.

* * * * *